W. J. BELCHER.
DRIVE CHAIN.
APPLICATION FILED SEPT. 8, 1919.
1,388,506. Patented Aug. 23, 1921.
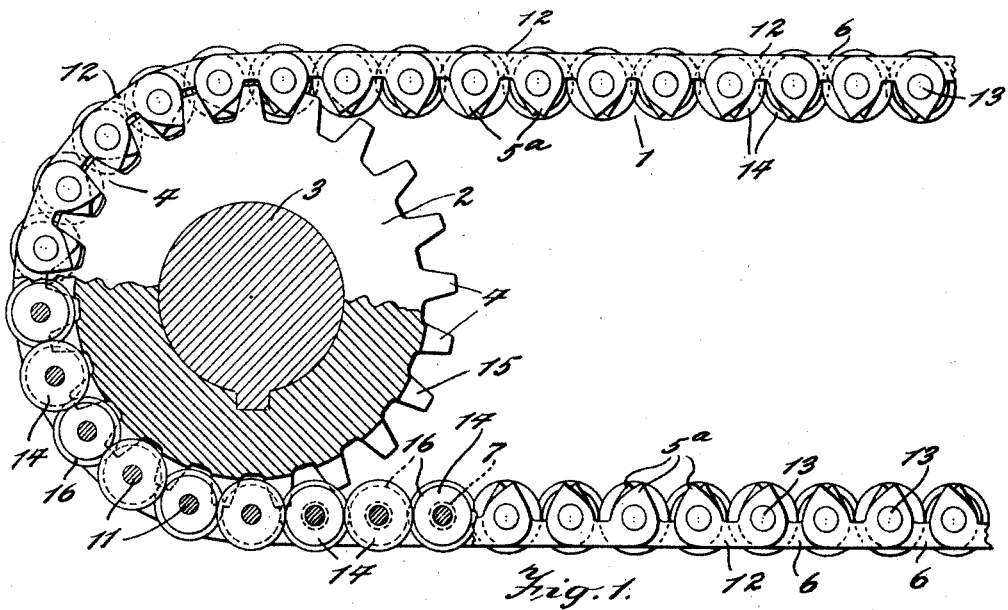
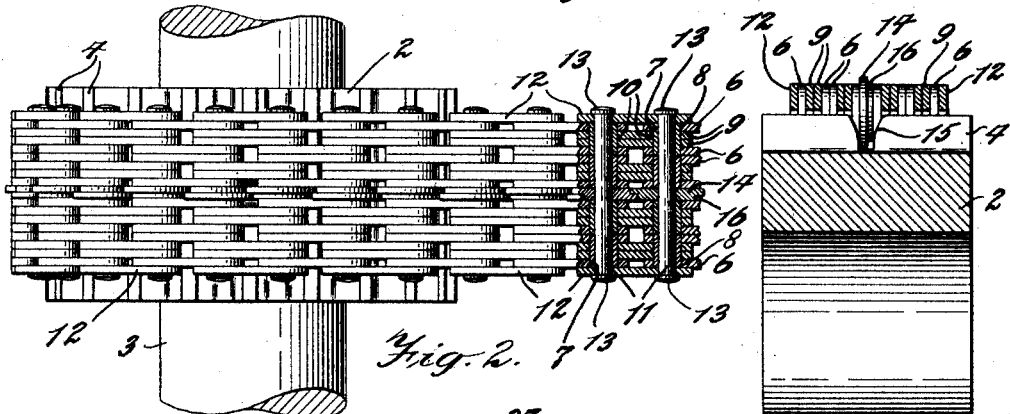
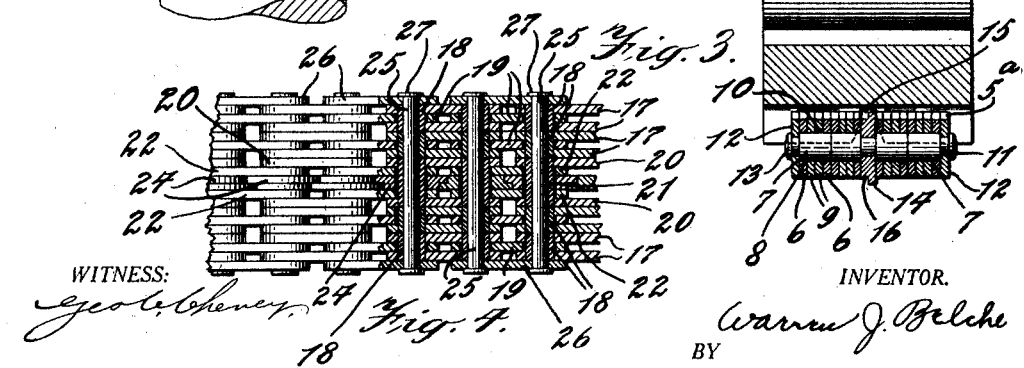
WITNESS: INVENTOR.
Warren J. Belcher
BY
Gifford & Bull
his ATTORNEYS

UNITED STATES PATENT OFFICE.

WARREN J. BELCHER, OF HARTFORD, CONNECTICUT, ASSIGNOR TO THE WHITNEY MANUFACTURING COMPANY, OF HARTFORD, CONNECTICUT, A CORPORATION OF CONNECTICUT.

DRIVE-CHAIN.

1,388,506. Specification of Letters Patent. Patented Aug. 23, 1921.

Application filed September 8, 1919. Serial No. 322,462.

*To all whom it may concern:*

Be it known that I, WARREN J. BELCHER, a citizen of the United States, residing at Hartford, in the county of Hartford and State of Connecticut, have invented certain new and useful Improvements in Drive-Chains, of which the following is a specification.

My invention relates generally to new and useful improvements in drive chains adapted to coöperate with sprocket wheels, and particularly relates to that type of drive chain shown in my Patent No. 1,020,180, dated March 12, 1912. The invention contemplates improved means for maintaining a drive chain in proper relation to a sprocket wheel or the sprocket wheels with which it coöperates, and to limit lateral movement of the chain relative to the sprocket wheel or wheels.

The invention consists in the improvements to be more fully described hereinafter, and the novelty of which will be particularly pointed out and distinctly claimed.

I have fully and clearly illustrated my invention in the accompanying drawings to be taken as a part of this specification, and wherein—

Figure 1 is a view in side elevation, partly in section, of a drive chain embodying my invention, and shown in operative relation to a sprocket wheel.

Fig. 2 is a plan view, partly in section.

Fig. 3 is a vertical section through the chain and sprocket wheel with which it is associated, taken through the axis of the wheel shown in Fig. 1.

Fig. 4 is a plan view, partly in section, of another embodiment of the same invention.

Referring to the drawings by characters of reference, 1 designates in general, a sprocket chain embodying my present invention, said chain being shown in driving, or driven engagement, as the case may be, with a sprocket wheel 2 which may be mounted on a driving or driven shaft 3. The sprocket chain may be of the general type and construction shown in my said Patent No. 1,020,180, being formed of a plurality of overlapping and interengaging toothed plates or links adapted to ride over the teeth 4 on the sprocket wheel, and said plates or links having teeth 5ª to engage the faces of the teeth of the sprocket wheel to provide for the driving engagement between the chain and the wheel. The chain is preferably made up of a number of chain elements or units which are assembled to form a complete chain, as described in my said patent, which chain element consists of outer links 6 in spaced relation and connected by sleeves or bushings 7 preferably fixed in openings 8 in the ends of the links 6, said links 6 being connected by one or more intermediate links 9, the end portions of which extend between the ends of adjacent outer links 6, and are provided with openings 10 loosely receiving the said bushings 7. As shown in the accompanying drawings, the chain is made up of four sets of these chain elements, see particularly the sectional portion of Fig. 2 of the drawings. While I have shown the chain made up of four chain elements, it will be readily understood that the chain may consist of less than that number, or more than that number if desired. The chain elements are connected by transverse pins 11 extending through alining bushings of the said chain elements, and at their outer ends projecting through outer end-plates or links 12, and headed or swaged over as at 13 so as to maintain the said end-plates in position and the chain elements connected in assembled relation to each other.

As shown in Figs. 2 and 3, wherein four of said chain elements are employed, the said elements are arranged preferably in pairs on opposite sides of the longitudinal central median line of the chain, so as to provide spaces centrally of the chain between said pairs of chain elements and the bushings or sleeves 7. In these spaces and surrounding the said pins 11 are guide elements preferably in the form of circular plates or disks 14, forming rollers which are adapted to coöperate with a peripheral groove 15 in the sprocket wheel so as to engage the side walls of the groove, and thereby maintain the chain against lateral movement on the sprocket wheel. In order to increase the bearing surface of rollers against the walls of the groove, and also in order to sustain and support the peripheral portions of the said rollers, said rollers are arranged so as to overlap and interengage each other. In order to provide for the interengagement of the said rollers, I preferably provide each roller with a stepped or recessed peripheral edge portion 16 adapted to receive a corresponding and reversed stepped or recessed peripheral portion 16 of the next adjacent roller. The rollers are shown as being free to rotate on the pins 11, but they may be fixed to the pins without departing from my invention. By providing as overlapping interengagement of the rollers, I am able to provide for the maximum surface engagement of the same with the walls of the groove in the sprocket wheel, and also to support and sustain the edge portions of the rollers so that the tendency will be for one roller to maintain the other in proper alinement to properly engage with the said groove in the sprocket wheel.

While I have shown the sprocket wheel provided with a central peripheral groove, and the chain as provided with centrally arranged circular members in the form of rollers, I do not limit myself to this central arrangement, as the groove may be otherwise disposed and the plates arranged correspondingly to coöperate therewith.

In Fig. 4 of the drawings, I have shown another embodiment of the same invention, in which the overlapping guide plates are mounted on bushings connecting the toothed elements instead of mounting the same directly on the transverse pins. In this form of the invention the main body of the chain is made up of separate chain elements or units assembled in proper number to make a chain of the desired width, said units being made up of sets or pairs of spaced outer links 17 connected by bushings 18 set in openings in the ends of said links, the said sets of links being connected by intermediate spaced links 19, having openings loosely mounted on said bushings 18. In this form the guide elements are included in a unit structure consisting of sets of spaced outer links 20 connected by bushings 21 set in openings in the ends of said links. The said sets of links 20 are connected by pairs of spaced intermediate links 22 having end openings 23 loosely mounted on said bushings 21. The guide elements, constructed as heretofore described with reference to Figs. 1 to 3, are shown at 24 and are mounted on said bushings 21, either being tightly fixed on the bushings or loose to rotate thereon. The chain units are connected transversely by cross pins 25 passing through outer links 26 and riveted over, as at 27.

What I claim and desire to secure by Letters Patent of the United States is:

1. A sprocket drive chain comprising overlapped toothed link members, transverse elements connecting the overlapped portions of said link members, and circular guide elements mounted on adjacent transverse elements and having the peripheries thereof overlapped between said transverse elements.

2. A sprocket drive chain provided with overlapping guide rollers.

3. A sprocket drive chain comprising overlapped toothed link members, transverse elements connecting the overlapped portions of said link members, and circular guide elements mounted on adjacent transverse elements and having the peripheries thereof overlapped between said transverse elements, said guide elements being arranged intermediate the width of the chain.

4. A sprocket drive chain provided with overlapping guide rollers disposed intermediate the width of the chain.

5. A sprocket drive chain provided with circular guide elements having stepped peripheries, the alternate rollers being reversely arranged and overlapping.

6. A sprocket drive chain provided with guide rollers having stepped peripheries, the alternate rollers being reversely arranged and arranged with the stepped peripheries in overlapping interengagement.

7. A sprocket drive chain comprising overlapped toothed link members, pins connecting the overlapped portions of said link members, and circular guide elements mounted on adjacent pins and having the peripheries thereof overlapped at a point between said pins.

8. A sprocket drive chain comprising a plurality of toothed elements connected by transverse pins, and circular guide elements mounted on said pins and having the peripheries thereof stepped and in overlapping interengagement at a point between said pins.

9. A sprocket drive chain provided with overlapping guide rollers and a sprocket wheel adapted to be engaged by said chain, said wheel being formed with a peripheral groove in which said rollers are received.

10. A sprocket drive chain provided with guide rollers having stepped peripheries, the alternate rollers being reversely arranged and overlapping, and a sprocket wheel adapted to be engaged by said chain, said wheel being formed with a peripheral groove in which said rollers are received.

11. A sprocket drive chain comprising elements connected by pins and provided with guide rollers having stepped peripheries, the alternate rollers having their peripheries reversely arranged and in overlapping interengagement, and said rollers having bearing on alternate pins of the sprocket chain, and a sprocket wheel adapted to be engaged by said chain, said wheel being formed with a peripheral groove in which said rollers are received.

In testimony whereof I have signed my name in the presence of two subscribing witnesses.

WARREN J. BELCHER.

Witnesses:
Park C. Boyd,
R. W. Randall.